United States Patent [19]
Kimball

[11] Patent Number: 5,443,408
[45] Date of Patent: Aug. 22, 1995

[54] LOW DRAG BUOY

[75] Inventor: William C. Kimball, Gloversville, N.Y.

[73] Assignee: N. A. Taylor Co., Inc., Gloversville, N.Y.

[21] Appl. No.: 207,128

[22] Filed: Mar. 8, 1994

[51] Int. Cl.$^6$ .............................................. B63C 9/08
[52] U.S. Cl. ................................................. 441/22
[58] Field of Search ............... 441/1, 2, 3, 6, 7, 10, 441/21, 22, 23, 32, 28, 29

[56] References Cited

U.S. PATENT DOCUMENTS

| | | | |
|---|---|---|---|
| 2,546,956 | 3/1951 | Yeomans | 441/29 |
| 3,329,119 | 7/1967 | Fritzche | 441/28 |
| 3,886,602 | 6/1975 | Stanwood | 441/6 |
| 3,906,565 | 9/1975 | Dorrance et al. | |
| 4,094,281 | 7/1978 | Bowley | 441/6 |
| 4,954,110 | 9/1990 | Warnan | 441/22 |
| 4,995,842 | 2/1991 | Beyer-Olsen | |

FOREIGN PATENT DOCUMENTS 2039120 7/1980 United Kingdom ..................... 441/6

OTHER PUBLICATIONS

Bushnell et al, "Turbulence Control in Wall Flows", Ann. Rev. Fluid Mech. 1989. 21:1-20, pp. 1-19.
Choi et al, "Direct Numerical Simulation of Turbulent Flow Over Riblets", J. Fluid Mech. (1993), vol. 255, pp. 503-539.
Berteaux, "Buoy Engineering", Woods Hole Oceanographic Institution, Woods Hole, Massachusetts, pp. 262, 263, 1976.

Primary Examiner—Stephen Avila
Attorney, Agent, or Firm—Nixon & Vanderhye

[57] ABSTRACT

A low drag buoy uses diameter reductions and spoilers of a buoyant body surface to reduce the drag. An end structure at one end of a buoyant body allows connection of that end to a line, and a number of different diameter portions are provided between the ends of the body, a step reduction in diameter being provided at a juncture between each of the different diameter portions. A spoiler is provided on the larger diameter portion at each juncture, the spoiler typically being a flipper extending circumferentially outwardly from the larger diameter portion at each juncture, with a ramp surface leading from the body to the flipper, and a substantially flat and radially extending surface of the flipper opposite the ramp. The flipper typically extends outwardly from the body about 0.04–0.08 inches, and the step reduction at each of the junctures (not counting the flipper) is about 0.1–0.125 inches. The body may have a generally ovoid, cylindrical, or other body of revolution configuration. A number of longitudinal ribs may also be disposed on the body, upstanding from it, and may provide reduced spinning and increased stability for the buoy if pulled along the surface of water from its first end.

20 Claims, 3 Drawing Sheets

LOW DRAG BUOY

BACKGROUND AND SUMMARY OF THE INVENTION

Buoys are commonly used by commercial fishermen as markers for crab pots, nets, and for a wide variety of other uses. When the buoys are retrieved they typically are pulled along the surface of the water by a pole with a hook at the end, a grappling hook attached to a rope, or by other mechanisms. Oftentimes, buoys are constructed in such a way as to attempt to minimize the drag as the buoys are pulled along the surface of the water to make retrieval easier. For example, smooth surfaced glass sphere buoys are provided in nets, or in plastic containers having ribs, the nets and ribs providing turbulence which reduces the drag on the buoys. U.S. Pat. No. 3,906,565 shows an elongated buoy with a smooth surface having a plurality of longitudinal ribs thereon for reducing drag while also providing stability, and U.S. Pat. No. 4,995,842 shows an elongated buoy with a smooth surface having a plurality of square edged circumferential ribs for reducing drag.

Prior art buoys as described above do provide lower drag than conventional completely smooth surfaced buoys, however their ability to reduce drag has not previously been optimized. Therefore, there is a need to reduce drag even further, while still providing a buoy construction that is relatively easy to manufacture using commercially available techniques. Also, some of the prior art buoys described above have a tendency to spin during retrieval, which is undesirable since it can cause twisting or bunching of a line connected to the buoy or a line used for retrieval, and it is desirable to minimize such spinning.

According to the present invention, a buoy is provided—particularly designed for use by commercial fishermen—which has significantly less drag than prior art buoys. The buoy according to the invention also can be constructed so as to—it is believed—have minimal spin (and enhanced stability) during retrieval. Yet the buoy according to the invention can still be constructed in a relatively simple manner, using commercially available techniques.

The buoy according to the invention is a radical departure from the prior art buoys which have smooth surfaces with ribs—either in the form of nets or integrally molded ribs—extending outwardly from the smooth surfaces. According to the invention, a diameter variation, typically a diameter reduction, is provided at spaced locations along the longitudinal axis of the buoy extending from a first end to which a line is attached (e.g. which leads to a crab pot, etc.) to a second end. At the juncture of the different diameter portions, at each step reduction, a spoiler is provided on the larger diameter portion. The spoiler typically takes the form of a flipper with a ramp leading from the larger diameter portion to the flipper, and a substantially flat and radially extending surface of the flipper opposite the ramp.

The construction according to the invention is highly advantageous compared to conventional smooth walled buoys with nets or integral ribs for a number of reasons. The step-down construction provides a greater distance from the top of the spoiler (flipper) to the "downstream" buoy sidewall which enhances the spoiling action. Increasing the height of the spoiler so that it extended from a smooth sidewall the same amount would not be nearly as effective since this would also increase the size of the ramp leading from the upstream wall of the buoy to the spoiler, which in turn would add drag. The construction according to the invention has a negligible introduction of drag on the ramp side, but a maximum spoiling effect with a relatively large drop on the "downstream" end.

The ramp arrangement leading from the buoy sidewall to the flipper also is advantageous compared to a square rib extending from a smooth sidewall, or a rib that is rounded at both the "upstream" and "downstream" ends thereof. In the square rib construction the "upstream" edge adds drag, while in the double rounded construction, the "downstream" rounded portion does not produce as effective a spoiling action. Therefore the ramp and flipper configuration alone, according to the invention, can produce significant reduction in drag.

Overall, the buoy construction according to the present invention can achieve about a 50% reduction, or more, in drag compared to prior art constructions if the buoy is being pulled along the surface of the water at a speed of about 6–8 knots (a typical speed for commercial fishing buoy retrieval operations). Further, by providing a plurality of longitudinal ribs spaced around the circumference of the buoy, it is believed possible to reduce spinning and provide enhanced stability during retrieval.

According to one aspect of the present invention, a low drag buoy is provided comprising the following components: A buoyant body having first and second ends spaced from each other along a longitudinal axis, the body having the general configuration of a body of revolution (e.g. sphere, cylinder, ovoid, or the like). An end structure at the first end allowing connection of the first end to a line. The body having a plurality of different diameter portions between the first and second ends, a step reduction in diameter being provided at a juncture between each of the different diameter portions moving from the first end to the second end. And a spoiler provided on the larger diameter portion at each juncture. Each of the spoilers preferably comprises a flipper extending circumferentially outwardly from the larger diameter portion at each juncture, and a ramp surface leading from the body to the flipper from the first end toward the second end, the flipper having a substantially flat and radially extending surface opposite the ramp.

The ramp surface preferably has an angle of inclination of about 20–60 degrees (most desirably about 30–45 degrees) with respect to the longitudinal axis. While the ramp surface is preferably planar, it may be slightly radiused. Particularly good results are achieved when the flipper extends outwardly from the body about 0.04–0.08 inches (most, desirably about 0.062 inches), where the step reduction at each of the junctures, not counting the flipper, is about 0.1–0.125 inches (so that the diameter of the body at a juncture decreases about 0.2–0.25 inches), and where the angle of inclination is about 45°. The junctures with step reductions are typically provided about every 3–6 (e.g. 4–5) inches along the longitudinal axis.

The body of revolution configuration of the body may take a variety of different forms. For example, after at least one of the step reductions the diameter of the body may gradually increase so that it is larger than the larger diameter portion at the at least one step reduction (that is the body having a generally spherical or ovoid shape). Alternatively, the diameter of the body may be consistently reduced at each juncture and then between junctures from the first end to the second end thereof (that is the body having a generally cylindrical shape). Rather than having high elongation, the body may have a length along the longitudinal axis, and a maximum diameter, such that the length is about 15-50% greater than the maximum diameter.

The low drag buoy according to the invention also may further comprise a plurality of longitudinal ribs, extending substantially parallel to the longitudinal axis, disposed on the body and upstanding therefrom, which may provide reduced spinning, and increased stability, of the buoy if pulled along the water surface from the first end of the body. The end structure at the first end typically comprises a substantially conical cap integral with the body, and a generally planar ear extending outwardly from the substantially conical cap, and an opening provided in the ear generally perpendicular to the longitudinal axis. Typically no end structure is provided at the second end of the buoy.

According to another aspect of the present invention, a low drag buoy is provided comprising the following elements: A varying diameter body of buoyant material and having first and second ends spaced from each other along a longitudinal axis, the body having the general configuration of a body of revolution (e.g. cylinder, sphere or ovoid). An end structure at the first end allowing connection of the first end to a line. And a plurality of flippers provided along the longitudinal axis of the body, each flipper extending circumferentially outwardly from the body, and a ramp surface leading from the body to each of the flippers from the first end toward the second end, and each of the flippers having a substantially flat and radially extending surface opposite the ramp. The details of the ramp surface, and the details of the other components, may be as described above.

It is the primary object of the present invention to provide a low drag buoy, particularly one with good stability during retrieval. This and other objects of the invention will become clear from an inspection of the detailed description of the invention and from the appended claims.

DETAILED DESCRIPTION OF THE DRAWINGS

Figures 1, 2:
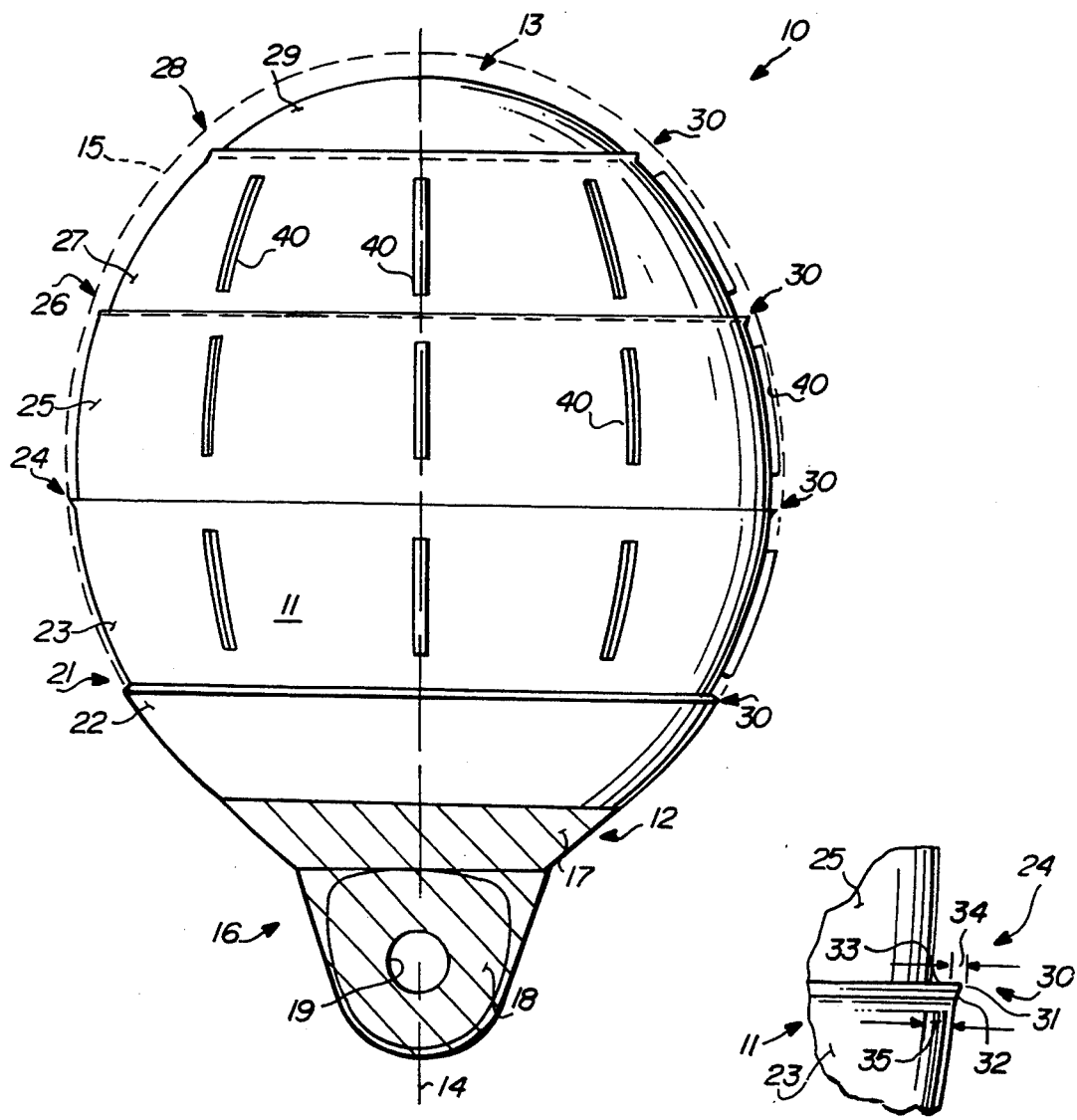
FIG. 1 is a side view of a first configuration of a commercial fishing buoy according to the present invention.
FIG. 2 is a detail enlarged side view showing a step reduction juncture and spoiler of the buoy of FIG. 1.

An exemplary commercial fishing buoy according to the present invention is shown generally by reference numeral 10 in FIG. 1. The buoy 10 has low drag when retrieved, typically having a drag at least about 50% less than prior art low drag buoy constructions when being pulled along the surface of the water at a speed of about 6-8 knots. The buoy 10 includes a buoyant body 11, of conventional buoyant materials (e.g. a hollow plastic shell, or a hollow outer plastic shell filled with a buoyant material), and has first 12 and second 13 ends spaced from each other along a longitudinal axis 14. The body 10 has the general configuration of a body of revolution, such as a sphere, ovoid, or cylinder. In the particular embodiment illustrated in FIG. 1, the body 11 has generally an ovoid configuration, the dotted line 15 indicating a substantially true ovoid configuration, which the body 11 according to the present invention slightly departs from because of the step reductions provided in the body 11 as will be herein after described.

The first end 12 the buoy 10 includes an end structure, shown generally by reference numeral 16, allowing connection of the first end 12 to a line (rope, cable, etc.). As illustrated in FIG. 1, the end structure 16 may comprise a substantially conical cap 17 (a truncated cone) integral with the body 11, and a generally planar (e.g. completely planar or tapered surfaces) ear 18 extending outwardly from the conical cap 17. An opening 19 is provided in the ear 18, the opening 19 extending generally perpendicular to the longitudinal axis 14, and the opening 19 having a diameter large enough to receive a conventional line which attaches the buoy 10 to a crab pot, net, or other structure as is conventional for commercial fishing.

The body 11, according to the present invention, has a plurality of different diameter portions between the first 12 and second 13 ends thereof, a step reduction in diameter being provided at a juncture between each of the different diameter portions moving from the first end 12 to the second end 13. For example in the embodiment illustrated in FIG. 1, the juncture 21 provides a diameter reduction between the portion 22 and the portion 23, the juncture 24 provides a diameter reduction between the portion 23 and the portion 25, the juncture 26 provides a diameter reduction between the portion 25 and the portion 27, and the juncture 28 provides a diameter reduction between the portion 27 and the portion 29. As can be seen by comparing the dotted line 15 of a true ovoid configuration to the actual surface structure of the body 11, by the second end 13 the diameter is significantly reduced compared to what it would have been without step reductions provided at the junctures 21, 24, 26, and 28.

At each of the junctures 21, 24, 26 and 28 a spoiler is provided on the larger diameter portion at each juncture. The spoilers are illustrated generally by reference numerals 30 in FIG. 1 and can be seen in detail in FIG. 2, which shows the juncture 24 (the configuration at each of the other junctures being substantially the same). As seen most clearly in FIG. 2, the spoiler 30 includes a flipper 31 which extends circumferentially outwardly from the larger diameter portion 23 at the juncture 24, and includes a ramp surface 32 leading from the body 11 to the flipper 31 from the first end 12 toward the second end 13. The flipper 31 has a substantially flat and radially (that is substantially perpendicular to the axis 14) extending surface 33 opposite the ramp 32.

The ramp surface 32 is preferably substantially planar, although it can be slightly radiused as illustrated in FIG. 2. The ramp surface 32 typically makes an angle of about 20°-60° with respect to the longitudinal axis 14, with about 30°–45° preferred. Note that the flipper 31 extends outwardly from the body 11 (the larger diameter portion 23 at the juncture 24) the distance indicated by reference numeral 34, which need only be a small amount to provide effective spoiling action, e.g. about 0.4–0.8 inches (preferably about 0.062 inches). The step reduction provided at the juncture 24, not counting the flipper 31, is indicated by reference numeral 35, and is about 0.1–0.125 inches. That means that the diameter of the body 11 at a juncture (e.g. the juncture 24) decreases about 0.2–0.25 inches. What this also means is that the substantially planar surface 33 at what will be the "downstream" end of the flipper 31 as the buoy 10 is being retrieved, is about 0.187 inches (if the dimension 34 is 0.62 inches and the dimension 35 0.125 inches), yet the ramp surface 32 adds only a negligible amount of drag because of the small height (radially outward extent) of the flipper 31 from the body portion 23.

The step reductions 21, 24, 26, 28 are typically continuous around the circumference of the body 11, and provided about every three-six (preferably about four-five) inches along the axis 14. For example if the length of the buoy 10 (along the axis 14) not counting the ear 16 is about 19 inches, four step reductions 21, 24, 26, and 28 are provided therealong as illustrated in FIG. 1. Also as illustrated in FIG. 1, there preferably is no end structure, aside from a curved surface, at the second end 13 of the buoy.

For the particular ovoid configuration of the body 11 of the buoy 10 of FIGS. 1 and 2, the length of the body 11 itself (not counting the end structure 16) is about 15–50% greater than the maximum diameter of the body 11. For example if the length of the body 11 is about 18–19 inches, the maximum diameter of the body 11 may be about 16 inches.

Note that in the configuration illustrated in FIG. 1, while the diameter of the body 11 has a clear step reduction at each of the junctures 21, 24, 26, and 28, the diameter of the body 11 may gradually increase so that it is larger than the larger diameter portion and at least one of the step reductions (that is the body 11 having a generally ovoid or spherical shape, such as the generally ovoid shape of FIG. 1). For example for the buoy 10, while there is a step reduction between the larger diameter portion 22 and the "smaller" diameter portion 23 at the juncture 21, as one moves from the first end 12 to the second end 13 the diameter of the portion 23 gradually increases so that it is eventually—at the juncture 24—significantly larger than the diameter if the portion 22 at the juncture 21. However all of the rest of the portions 25, 27, 29 in FIG. 1 are less in diameter, throughout the entire extent thereof, then the preceding portions 23, 25, 27, respectively.

The buoy 10 also may include a plurality of longitudinal ribs 40 extending substantially parallel to the axis 14, and disposed on the body 11 upstanding therefrom. The ribs 40 may be discontinuous—as illustrated in FIG. 1—or continuous (see 240 in FIG. 5), and can extend any desired amount of the length of the body 11 (along the axis 14). The ribs 40 are believed to provide reduced spinning and increased stability for the buoy 10 if pulled along the water from the first end 12 thereof, as would be the case to in a conventional buoy retrieval operation in commercial fishing. The exact configuration of the rib 40 is not critical—it may have a generally "square" configuration in cross-section, a semi-circular cross-section, or a variety of other shapes, as long as it can reduce the spinning, and enhance the stability, of the buoy 10 during retrieval.

Figure 3:
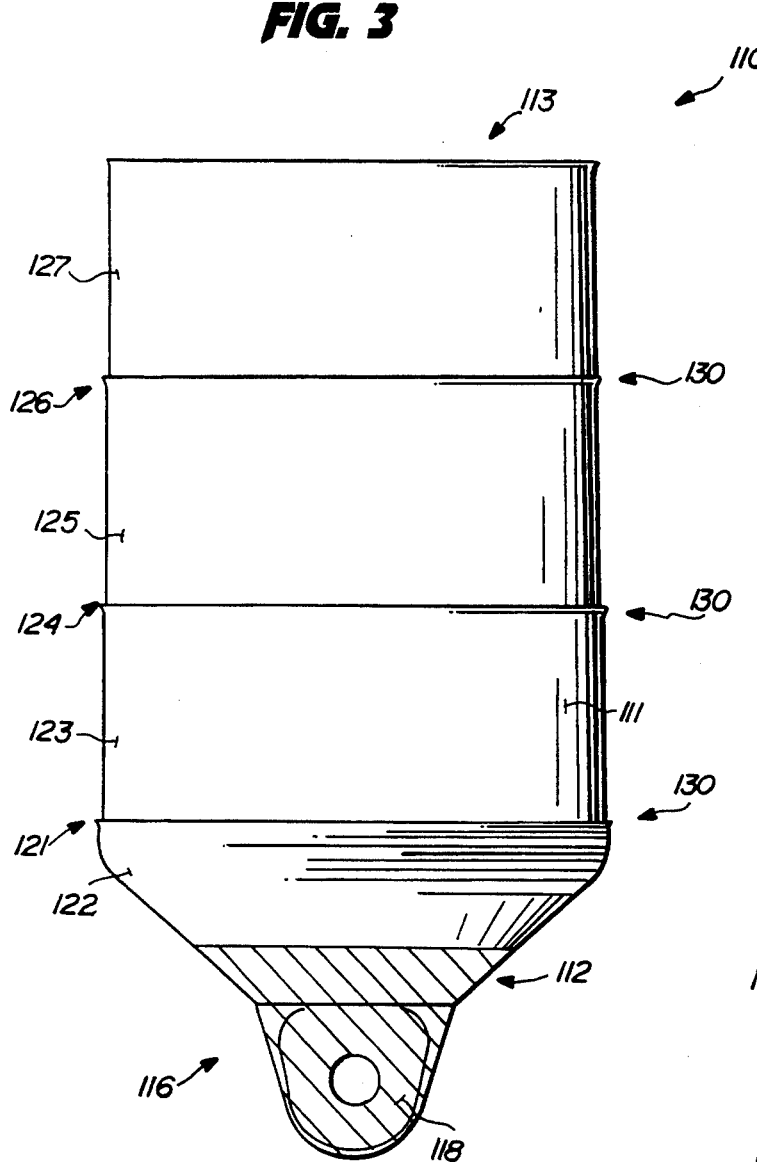
FIG. 3 and 4 are views like those of FIGS. 1 and 2, respectively, only for a second configuration of buoy according to the present invention.
Figure 4:
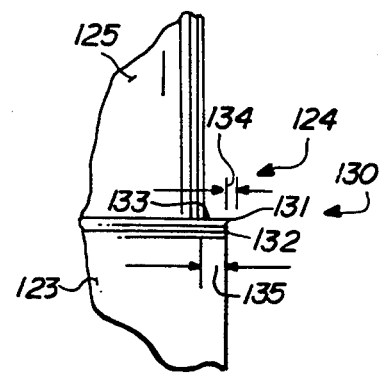

FIGS. 3 and 4 illustrate a modified configuration of a buoy according to the present invention. In the FIGS. 3 and 4 embodiment components comparable to those in the FIGS. 1 and 2 embodiment are shown by the same two digit reference numeral only preceded by a "1". Therefore all of the individual elements will not be described, but rather attention is directed to the description of the like reference numeral components in the FIGS. 1 and 2 embodiment. Rather only the most significant differences between the FIGS. 3 and 1 embodiments will be described.

The major distinction between the FIG. 3 buoy 110 and the FIG. 1 buoy 10 is the nature of the body of revolution which the buoy body 111 simulates. In FIG. 3 the body 111 has generally the configuration of a cylinder, although not a true cylinder since there is a consistent reduction in diameter between the portions 122, 123, 125, and 127 at each of the junctures 121, 124, and 126. Also in this particular embodiment the second end 113 is shown as being flat, although it can have a rounded end configuration similar to the body portion 29 in FIG. 1. The dimension 134 is preferably about 0.4–0.08 inches (about 0.062 inches), and the dimension 135 is preferably about 0.1–0.125 inches. Also the buoy 110 is shown without ribs (such as the ribs 40 in FIG. 1), although ribs can be provided.

Figure 5:
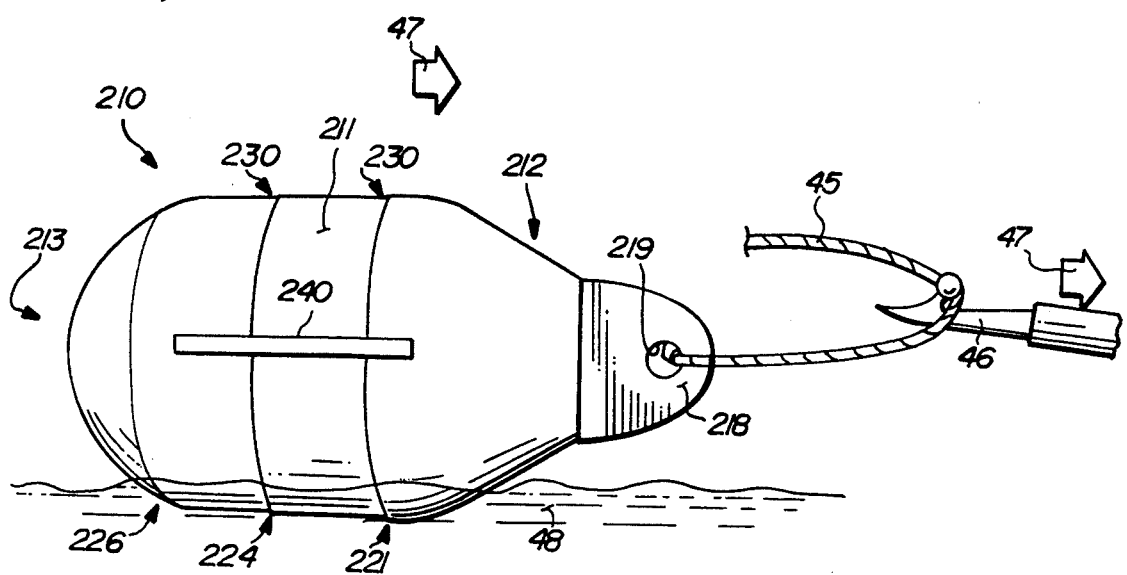
FIG. 5 is a schematic isometric view showing a buoy according to the present invention having a slightly different configuration than those of FIGS. 1 and 3, in use as it moves over the surface of water during a buoy retrieval operation.
Figure 6:
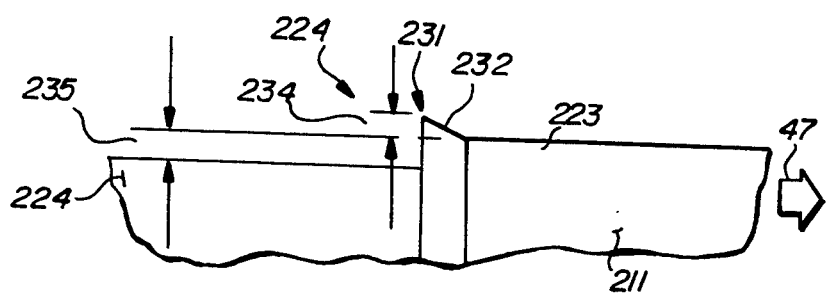
FIG. 6 is a detail enlarged side view of the step reduction and spoiler configuration of the buoy of FIG. 5.

FIG. 5 illustrates a buoy 210 similar to the buoys 10, 110, only having a slightly different configuration. In FIGS. 5 and 6 components comparable to those in FIGS. 1 through 4 are shown by the same two digit reference numeral only preceded by a "2".

FIG. 5 shows the buoy 210 during a buoy retrieval operation of a conventional type during commercial fishing. A line 45 has been passed through the opening 219 in the ear 218 at the first end 212 of the buoy. The line 45—which connects the buoy 210 to a crab pot or the like—is engaged by the hook 46 held or controlled by an operator on a commercial fishing vessel, and the buoy 210 is being pulled in the direction 47 and "riding" on the surface of the water 48 in FIG. 5. A typical speed in the direction 47 during the commercial fishing operation is about 6–8 knots, and at that speed the buoy 210 according to the invention, with the step reductions 221, 224, 226 and spoilers 230, where the flipper 231 dimension 234 is about 0.062 inches, and the diameter reduction 235 is about 0.125 inches, has at least about 50% less drag than a buoy with smooth walls and integral square edged ribs, or ribs formed by a net or plastic shroud surrounding a smooth walled buoy.

The buoy 210 is preferably also provided with one or more (only one being shown in FIG. 5) longitudinal ribs 240. The ribs 240 are believed to minimize spinning of the buoy as it is pulled in the direction 47, and enhance its stability.

It will thus be seen that according to the present invention a buoy with low drag, and enhanced stability, compared to prior art commercial fishing buoys, has been provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A low drag buoy comprising:
a buoyant body having first and second ends spaced from each other along a longitudinal axis, said body having the general configuration of a body of revolution;
an end structure at said first end allowing connection of said first end to a line;
said body having a plurality of different diameter portions between said first and second ends, a step reduction in diameter being provided at a juncture between each of said different diameter portions moving from said first to said second end; and
a spoiler provided on the larger diameter portion at each juncture.

2. A low drag buoy as recited in claim I wherein at least some of said spoilers each comprises a flipper extending circumferentially outwardly from the larger diameter portion at each juncture, and a ramp surface leading from said body to said flipper from said first end toward said second end, the flipper having a substantially flat and radially extending surface opposite said ramp.

3. A low drag buoy as recited in claim 2 wherein said ramp surface has an angle of inclination of about 30–45 degrees with respect to said longitudinal axis.

4. A low drag buoy as recited in claim 3 wherein said ramp surface is slightly radiused.

5. A low drag buoy as recited in claim 2 wherein said flipper extends outwardly from said body about 0.04–0.08 inches.

6. A low drag buoy as recited in claim 5 wherein said step reduction at each of said junctures, not counting said flipper, is about 0.1–0.125 inches so that the diameter of said body at a juncture decreases about 0.2–0.25 inches.

7. A low drag buoy as recited in claim 6 wherein after at least one of said step reductions the diameter of said body gradually increases so that it is larger than the larger diameter portion at said at least one step reduction, said body having a generally ovoid or spherical shape.

8. A low drag buoy as recited in claim 6 wherein the diameter of said body consistently reduces at each juncture and then between junctures from said first end to said second end thereof, said body having a generally cylindrical shape.

9. A low drag buoy as recited in claim 1 wherein said body has a length along said longitudinal axis, and a maximum diameter, and wherein said length is about 15–50% greater than said maximum diameter.

10. A low drag buoy as recited in claim 1 further comprising a plurality of longitudinal ribs, extending substantially parallel to said longitudinal axis, disposed on said body and upstanding therefrom to provide reduced spinning and increased stability of said buoy if pulled along the surface of water from said first end of said body.

11. A low drag buoy as recited in claim 1 wherein said junctures with step reductions are provided about every 3–6 inches along said longitudinal axis.

12. A low drag buoy as recited in claim 1 wherein said end structure comprises a substantially conical cap integral with said body, and a generally planar ear extending outwardly from said substantially conical cap, and an opening provided in said ear generally perpendicular to said longitudinal axis and large enough to receive a line, and wherein no end structure is provided at said second end.

13. A low drag buoy as recited in claim 6 wherein said junctures with step reductions are provided about every 3–6 inches along said longitudinal axis.

14. A low drag buoy as recited in claim 1 wherein said step reduction at each of said junctures, not counting said spoiler, is about 0.1–0.125 inches so that the diameter of said body at a juncture decreases about 0.2–0.25 inches.

15. A low drag buoy as recited in claim 3 wherein said flipper extends outwardly from said body portion about 0.062 inches.

16. A low drag buoy comprising:
a varying diameter body of buoyant material and having first and second ends spaced from each other along a longitudinal axis, said body having the general configuration of a body of revolution;
an end structure at said first end allowing connection of said first end to a line; and
a plurality of flippers provided along said longitudinal axis of said body, each flipper extending circumferentially outwardly from said body, and a ramp surface leading from said body to each of said flippers from said first end toward said second end, and each of said flippers having a substantially flat and radially extending surface opposite said ramp.

17. A low drag buoy as recited in claim 16 wherein said ramp surface has an angle of inclination of about 20–60 degrees with respect to said longitudinal axis.

18. A low drag buoy as recited in claim 16 further comprising a plurality of longitudinal ribs, extending substantially parallel to said longitudinal axis, disposed on said body and upstanding therefrom to provide reduced spinning and increased stability of said buoy if pulled along the surface of water from said first end of said body.

19. A low drag buoy as recited in claim 16 wherein said body of revolution has a substantially ovoid configuration.

20. A low drag buoy as recited in claim 16 wherein said end structure comprises a substantially conical cap integral with said body, and a generally planar ear extending outwardly from said substantially conical cap, and an opening provided in said ear generally perpendicular to said longitudinal axis and large enough to receive a line therein, and wherein said flippers are disposed about every 3–6 inches along said longitudinal axis.

* * * * *